(12) United States Patent
Weissman et al.

(10) Patent No.: US 9,660,691 B2
(45) Date of Patent: *May 23, 2017

(54) ANTENNA INTERFACE CIRCUITS WITH QUADPLEXERS

(71) Applicant: QUALCOMM Incorporated, San Diego, CA (US)

(72) Inventors: Haim M Weissman, Haifa (IL); Rimon E Mansour, Nazareth (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,922

(22) Filed: Aug. 26, 2016

(65) Prior Publication Data

US 2016/0365889 A1 Dec. 15, 2016

Related U.S. Application Data

(63) Continuation of application No. 13/674,521, filed on Nov. 12, 2012, now Pat. No. 9,467,191.

(51) Int. Cl.
*H04B 1/52* (2015.01)
*H04B 1/40* (2015.01)
*H04B 1/00* (2006.01)

(52) U.S. Cl.
CPC .............. *H04B 1/52* (2013.01); *H04B 1/006* (2013.01); *H04B 1/0057* (2013.01); *H04B 1/0064* (2013.01); *H04B 1/40* (2013.01)

(58) Field of Classification Search
CPC ...... H04B 1/40; H04B 1/0057; H04B 1/0064; H04B 1/52; H04B 1/006; H04B 7/0426;
(Continued)

(56) References Cited

U.S. PATENT DOCUMENTS 7,239,853 B2 7/2007 Kearns
7,398,060 B2 7/2008 Frank
(Continued)

FOREIGN PATENT DOCUMENTS

CN 201122970 Y 9/2008
CN 102244533 A 11/2011
(Continued)

OTHER PUBLICATIONS

Agilent Technologies, Contiguous Diplexer-Genesys 2009, pp. 1-3. http://edocs.soco.agilent.com/display/genesys2009/Contiguous+Diplexer.
(Continued)

*Primary Examiner* — Ping Hsieh
*Assistant Examiner* — James Yang
(74) *Attorney, Agent, or Firm* — Liberty E. Mann

(57) ABSTRACT

Techniques for supporting data transmission and reception on multiple bands for carrier aggregation are disclosed. In an exemplary design, an apparatus (e.g., a wireless device) includes first and second antenna interface circuits coupled to first and second antennas, respectively. The first antenna interface circuit includes a first quadplexer for first and second bands. The second antenna interface circuit includes a second quadplexer for the first and second bands. The first quadplexer may be a duplicate of the second quadplexer, which may simplify implementation. Each antenna interface circuit may further include a diplexer, a duplexer, a triplexer, another quadplexer, switches, etc. The first and second quadplexers may support data transmission and reception on two bands in a first band group. Other circuits in the first and second antenna interface circuits may support data transmission and/or reception on additional bands, possibly in one or more other band groups.

20 Claims, 13 Drawing Sheets

(58) Field of Classification Search
CPC .......... H04B 1/48; H01Q 21/28; H01Q 21/30; H04W 36/06; H04W 88/06
See application file for complete search history.

(56) References Cited

U.S. PATENT DOCUMENTS

| | | | |
|---|---|---|---|
| 7,643,848 B2 | 1/2010 | Robinett et al. | |
| 7,656,251 B1 | 2/2010 | Bauder et al. | |
| 8,188,809 B2 | 5/2012 | Leinonen et al. | |
| 9,467,191 B2 | 10/2016 | Weissman et al. | |
| 2004/0189526 A1* | 9/2004 | Frank | H04B 1/0057 343/700 MS |
| 2008/0042778 A1 | 2/2008 | Jamneala et al. | |
| 2009/0233642 A1 | 9/2009 | Zhitnitsky | |
| 2010/0279709 A1 | 11/2010 | Shahidi et al. | |
| 2011/0116423 A1 | 5/2011 | Rousu et al. | |
| 2011/0235755 A1* | 9/2011 | Yang | H04B 7/0426 375/340 |
| 2012/0177026 A1 | 7/2012 | Uyehara et al. | |
| 2013/0051284 A1* | 2/2013 | Khlat | H04L 5/00 370/277 |
| 2014/0003300 A1 | 1/2014 | Weissman et al. | |

FOREIGN PATENT DOCUMENTS

| | | |
|---|---|---|
| WO | WO-2012008705 A2 | 1/2012 |
| WO | WO-2012109262 A1 | 8/2012 |

OTHER PUBLICATIONS

International Search Report and Written Opinion—PCT/US2013/069745—ISA/EPO—Feb. 14, 2014

* cited by examiner

ANTENNA INTERFACE CIRCUITS WITH QUADPLEXERS

CROSS-REFERENCE TO RELATED APPLICATIONS

The present application is a continuation of commonly owned U.S. patent application Ser. No. 13/674,521, filed Nov. 12, 2012, entitled "Antenna Interface Circuits With Quadplexers," the content of which is expressly incorporated herein by reference in its entirety.

BACKGROUND

Field

The present disclosure relates generally to electronics, and more specifically to antenna interface circuits for wireless devices.

Background

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to obtain a modulated RF signal, amplify the modulated RF signal to obtain an output RF signal having the proper output power level, and transmit the output RF signal via an antenna to a base station. For data reception, the receiver may obtain a received RF signal via the antenna and may amplify and process the received RF signal to recover data sent by the base station.

A wireless device may support carrier aggregation, which is simultaneous operation on multiple carriers. A carrier may refer to a range of frequencies used for communication and may be associated with certain characteristics. For example, a carrier may be associated with system and/or control information describing operation on the carrier. A carrier may also be referred to as a component carrier (CC), a frequency channel, a cell, etc. It is desirable to efficiently support carrier aggregation by the wireless device.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Antenna interface circuits that can efficiently support carrier aggregation on multiple bands via multiple antennas are disclosed herein. These antenna interface circuits may provide various advantages and may be used for various types of electronic devices such as wireless communication devices.

Figure 1:
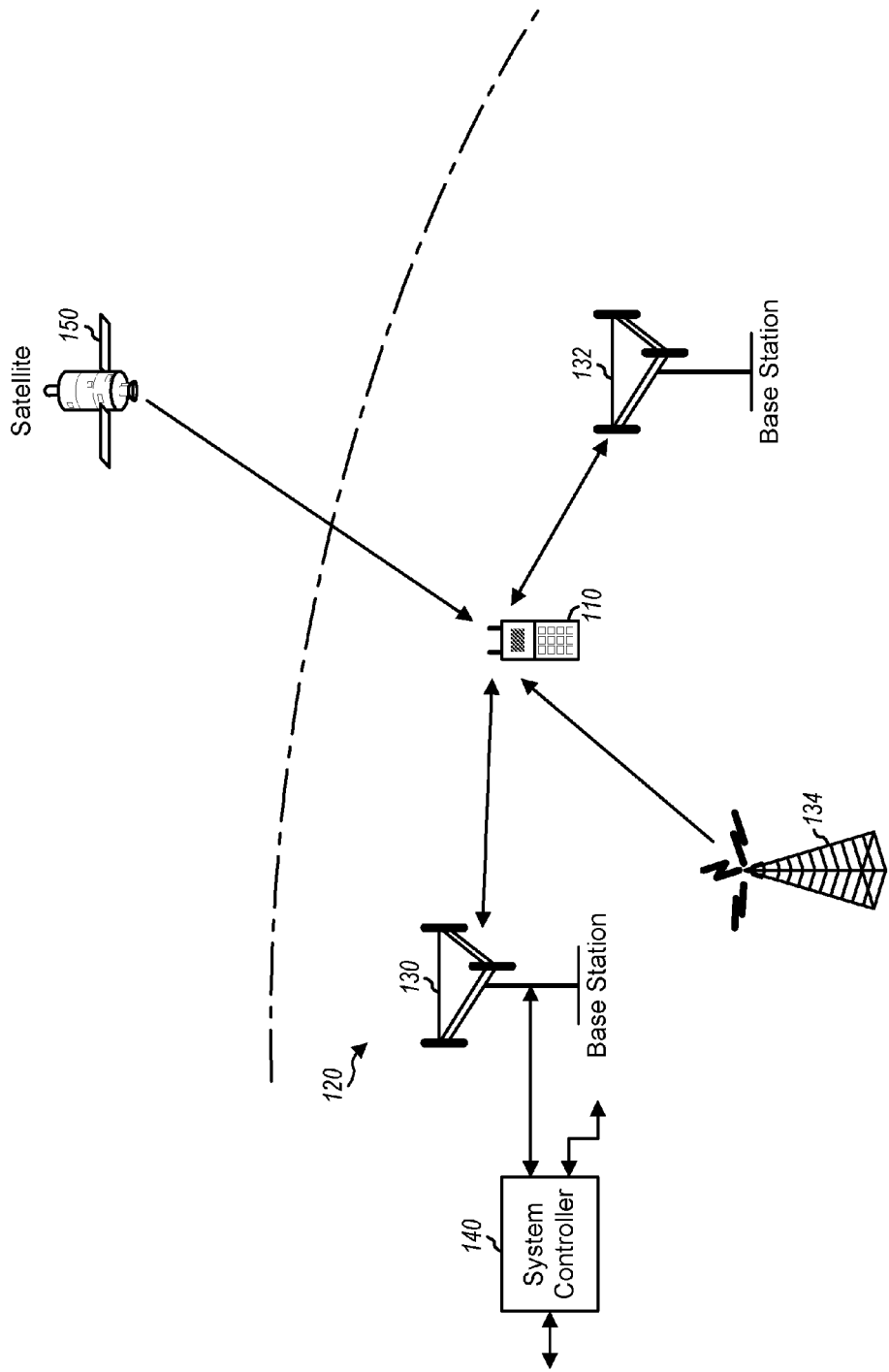
FIG. 1 shows a wireless device communicating with a wireless system.

FIG. 1 shows a wireless device 110 communicating with a wireless communication system 120. Wireless system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Time Division Synchronous CDMA (TD-SCDMA), or some other version of CDMA. For simplicity, FIG. 1 shows wireless system 120 including two base stations 130 and 132 and one system controller 140. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may be capable of communicating with wireless system 120. Wireless device 110 may also be capable of receiving signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1X, TD-SCDMA, GSM, 802.11, etc.

Wireless device 110 may support carrier aggregation, which is operation on multiple carriers. Carrier aggregation may also be referred to as multi-carrier operation. Wireless device 110 may be able to operate in low-band (LB) covering frequencies lower than 1000 megahertz (MHz), mid-band (MB) covering frequencies from 1000 MHz to 2300 MHz, and/or high-band (HB) covering frequencies higher than 2300 MHz. For example, low-band may cover 698 to 960 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). Each band may cover up to 200 MHz and may include one or more carriers. Each carrier may cover up to 20 MHz in LTE. LTE Release 11 supports 35 bands, which are referred to as LTE/UMTS bands and are listed in 3GPP TS 36.101. Wireless device 110 may be configured with up to 5 carriers in one or two bands in LTE Release 11.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
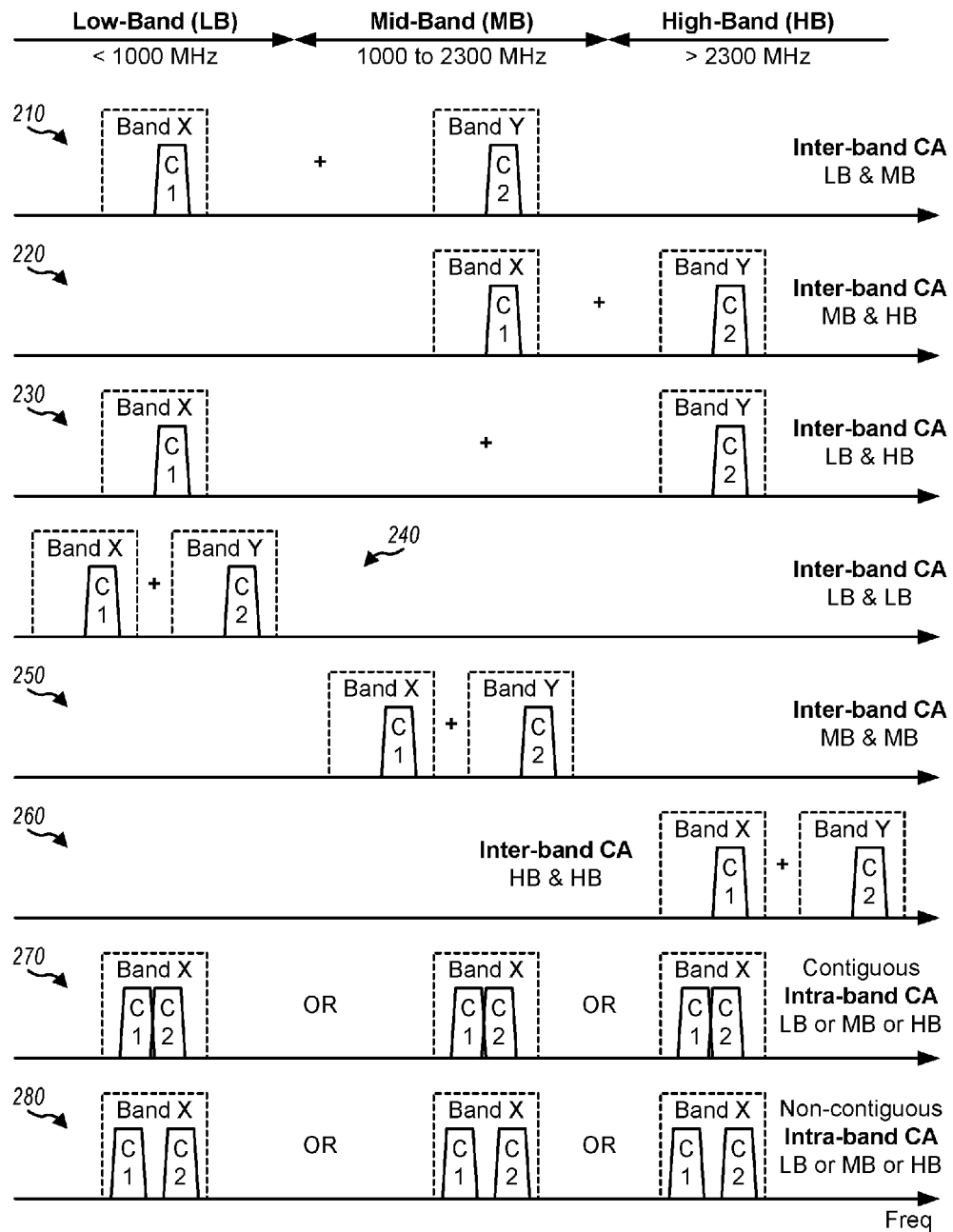
FIG. 2 shows various examples of carrier aggregation (CA).

FIG. 2 shows various CA scenarios that may be supported by wireless device 110. For simplicity, FIG. 2 shows one carrier being configured for wireless device 110 in each band for inter-band CA. In general, one or more carriers may be configured for wireless device 110 in a given band.

Scenario 210 covers inter-band CA with one carrier C1 in band X in low-band and one carrier C2 in band Y in mid-band being allocated to wireless device 110. Scenario 220 covers inter-band CA with one carrier C1 in band X in mid-band and one carrier C2 in band Y in high-band being allocated to wireless device 110. Scenario 230 covers inter-band CA with one carrier C1 in band X in low-band and one carrier C2 in band Y in high-band being allocated to wireless device 110.

Scenario 240 covers inter-band CA with one carrier C1 in band X in low-band and one carrier C2 in band Y also in low-band being allocated to wireless device 110. Scenario 250 covers inter-band CA with one carrier C1 in band X in mid-band and one carrier C2 in band Y also in mid-band being allocated to wireless device 110. Scenario 260 covers inter-band CA with one carrier C1 in band X in high-band and one carrier C2 in band Y also in high-band being allocated to wireless device 110.

Scenario 270 covers contiguous intra-band CA with two adjacent carriers C1 and C2 in band X in low-band, or mid-band, or high-band being allocated to wireless device 110. Scenario 280 covers non-contiguous intra-band CA with two non-adjacent carriers C1 and C2 in band X in low-band, or mid-band, or high-band being allocated to wireless device 110.

FIG. 2 shows some examples of carrier aggregation. Carrier aggregation may also be supported for other combinations of bands and band groups.

Inter-band CA may be grouped into four classes/categories, which may include the following:

Class A—LB and MB, or LB and HB, or MB and HB band combination without intermodulation (IMD) and harmonic relations between bands, Class B—LB and MB, or LB and HB, or MB and HB band combination with IMD and harmonic relations between bands, Class C—LB and LB, or MB and MB, or HB and HB band combination without IMD and harmonic relations between bands, and Class D—LB and LB, or MB and MB, or HB and HB band combination with IMD and harmonic relations between bands.

Wireless device 110 may be designed to meet the requirements for all four classes/categories of inter-band CA listed above.

Figure 3:
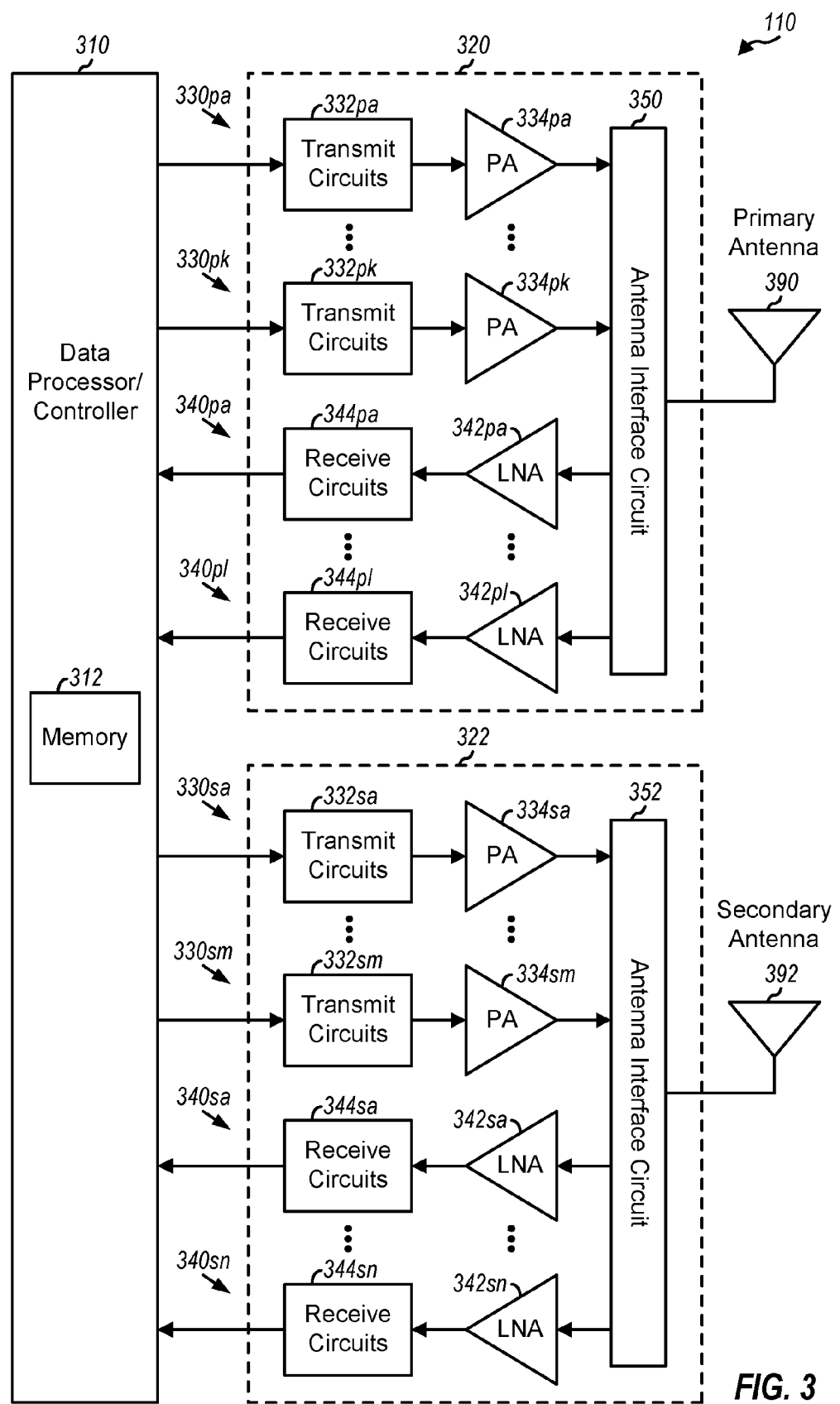
FIG. 3 shows a block diagram of the wireless device in FIG. 1.

FIG. 3 shows a block diagram of an exemplary design of wireless device 110 in FIG. 1. In this exemplary design, wireless device 110 includes a data processor/controller 310, a transceiver 320 coupled to a primary antenna 390, and a transceiver 322 coupled to a secondary antenna 392. Transceiver 320 includes K transmitters 330pa to 330pk, L receivers 340pa to 340pl, and an antenna interface circuit 350 to support multiple bands, carrier aggregation, multiple radio technologies, etc. K and L may each be any integer value of one or greater. Transceiver 322 includes M transmitters 330sa to 330sm, N receivers 340sa to 340sn, and an antenna interface circuit 352 to support multiple bands, carrier aggregation, multiple radio technologies, receive diversity, multiple-input multiple-output (MIMO) transmission, etc. M and N may each be any integer value of one or greater.

In the exemplary design shown in FIG. 3, each transmitter 330 includes transmit circuits 332 and a power amplifier (PA) 334. For data transmission, data processor 310 processes (e.g., encodes and modulates) data to be transmitted and provides an analog output signal to a selected transmitter. The description below assumes that transmitter 330pa is the selected transmitter. Within transmitter 330pa, transmit circuits 332pa amplify, filter, and upconvert the analog output signal from baseband to RF and provide a modulated RF signal. Transmit circuits 332pa may include amplifiers, filters, mixers, matching circuits, an oscillator, a local oscillator (LO) generator, a phase-locked loop (PLL), etc. A PA 334pa receives and amplifies the modulated RF signal and provides an output RF signal having the proper output power level. The output RF signal is routed through antenna interface circuit 350 and transmitted via antenna 390. Antenna interface circuit 350 may include one or more filters, duplexers, triplexers, quadplexers, diplexers, switches, matching circuits, directional couplers, etc. Each remaining transmitter 330 in transceivers 320 and 322 may operate in similar manner as transmitter 330pa.

In the exemplary design shown in FIG. 3, each receiver 340 includes a low noise amplifier (LNA) 342 and receive circuits 344. For data reception, antenna 390 receives signals from base stations and/or other transmitter stations and provides a received RF signal, which is routed through antenna interface circuit 350 and provided to a selected receiver. The description below assumes that receiver 340pa is the selected receiver. Within receiver 340pa, LNA 342pa amplifies the received RF signal and provides an amplified RF signal. Receive circuits 344pa downconvert the amplified RF signal from RF to baseband, amplify and filter the downconverted signal, and provide an analog input signal to data processor 310. Receive circuits 344pa may include mixers, filters, amplifiers, matching circuits, an oscillator, an LO generator, a PLL, etc. Each remaining receiver 340 in transceivers 320 and 322 may operate in similar manner as receiver 340pa.

FIG. 3 shows an exemplary design of transmitters 330 and receivers 340. A transmitter and a receiver may also include other circuits not shown in FIG. 3, such as filters, matching circuits, etc. All or a portion of transceivers 320 and 322 may be implemented on one or more analog integrated circuits (ICs), RF ICs (RFICs), mixed-signal ICs, etc. For example, transmit circuits 332, LNAs 342, and receive circuits 344 may be implemented on one module, which may be an RFIC, etc. Antenna interface circuits 350 and 352 and PAs 334 may be implemented on another module, which may be a hybrid module, etc. The circuits in transceivers 320 and 322 may also be implemented in other manners.

Data processor/controller 310 may perform various functions for wireless device 110. For example, data processor 310 may perform processing for data being transmitted via transmitters 330 and data being received via receivers 340. Controller 310 may control the operation of transmit circuits 332, PAs 334, LNAs 342, receive circuits 344, antenna interface circuits 350 and 352, or a combination thereof. A memory 312 may store program codes and data for data processor/controller 310. Data processor/controller 310 may be implemented on one or more application specific integrated circuits (ASICs) and/or other ICs.

Antenna interface circuits 350 and 352 may be implemented in various manners to support carrier aggregation. Some exemplary designs of antenna interface circuits 350 and 352 are described below. In general, an antenna interface circuit may include any number of duplexers, triplexers, quadplexers, multiplexers, diplexers, switches, etc. A duplexer is a circuit module/block comprising a transmit (TX) filter for data transmission and a receive (RX) filter for data reception. The TX filter and the RX filter of a duplexer are typically designed for a particular band. A triplexer is a circuit module/block comprising at least three filters (e.g., one TX filter and two RX filters) for data transmission and/or reception. A quadplexer is a circuit module/block comprising at least four filters (e.g., two TX filters and two RX filters) for data transmission and/or reception. A multiplexer is a circuit module/block comprising at least two filters. A multiplexer may be a duplexer, a triplexer, a quadplexer, etc. A diplexer typically includes a lowpass filter and a highpass filter, which may be used to separate signals in two band groups.

In an aspect of the present disclosure, carrier aggregation may be supported with an antenna interface circuit comprising a quadplexer and a diplexer, which may be used for each antenna. This architecture may flexibly support different band combinations for inter-band CA and intra-band CA and may also provide other advantages.

In another aspect of the present disclosure, carrier aggregation may be supported with "partial" multiplexing of transmissions on multiple bands via multiple antennas. Partial multiplexing refers to transmission on only a subset of the multiple bands via each antenna. For example, carrier aggregation on two bands A and B may be supported by transmitting on band A via a primary antenna and transmitting on band B via a secondary antenna. Partial multiplexing may provide benefits from antenna-to-antenna isolation, which may reduce power levels of harmonics and IMD products generated due to nonlinearity of circuits when data transmission and reception occur simultaneously on multiple bands. Partial multiplexing may also result in simpler circuits, which may reduce the size and cost of a wireless device.

Figure 4A:
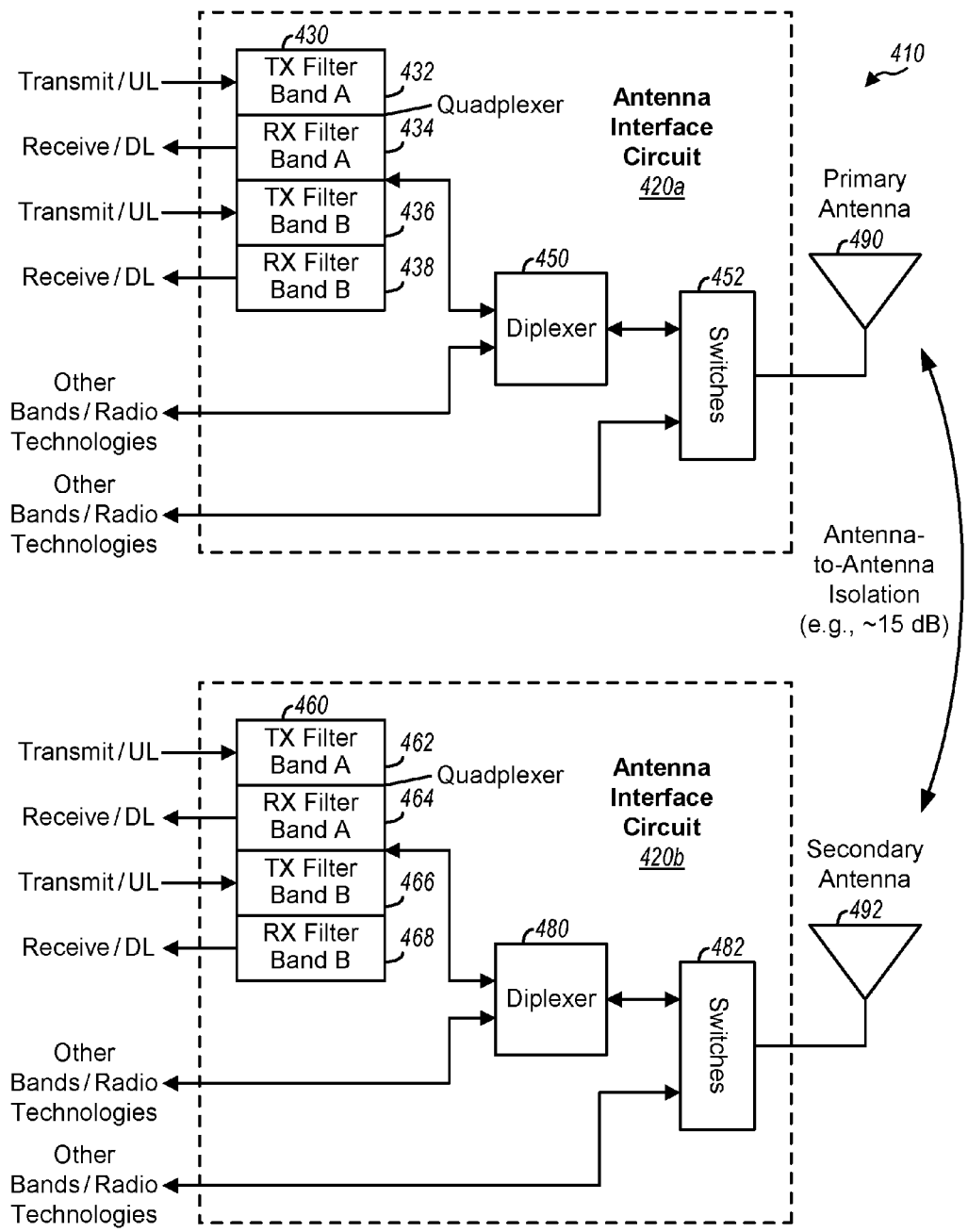
FIG. 4A to 5 show various exemplary designs of an RF front-end unit supporting carrier aggregation.

FIG. 4A show an exemplary design of an RF front-end unit 410 comprising antenna interface circuits 420a and 420b supporting carrier aggregation on two bands A and B via two antennas. Antenna interface circuits 420a and 420b may be used for antenna interface circuits 352 and 352, respectively, in FIG. 3. Antenna interface circuit 420a supports data transmission on the uplink and data reception on the downlink on bands A and B via a primary antenna 490. Antenna interface circuit 420b supports data transmission on the uplink and data reception on the downlink on bands A and B via a secondary antenna 492.

In the exemplary design shown in FIG. 4A, antenna interface circuit 420a includes a quadplexer 430 for bands A and B, a diplexer 450, and switches 452. Quadplexer 430 includes a TX filter 432 for band A, an RX filter 434 for band A, a TX filter 436 for band B, and an RX filter 438 for band B. The outputs of TX filters 432 and 436 and the inputs of RX filters 434 and 438 are coupled to an output of quadplexer 430, which is coupled to a first filter (e.g., a highpass filter) for bands A and B in diplexer 450. A second filter (e.g., a lowpass filter) in diplexer 450 may be coupled to a multiplexer and/or other circuits (not shown in FIG. 4A). Diplexer 450 is further coupled to one input of switches 452. Switches 452 may include other inputs coupled to circuits for other radio technologies, other bands, etc. An output of switches 452 is coupled to primary antenna 490.

In the exemplary design shown in FIG. 4A, antenna interface circuit 420b includes a quadplexer 460 for bands A and B, a diplexer 480, and switches 482. Quadplexer 460 includes a TX filter 462 for band A, an RX filter 464 for band A, a TX filter 466 for band B, and an RX filter 468 for band B. The outputs of TX filters 462 and 466 and the inputs of RX filters 464 and 468 are coupled to an output of quadplexer 460, which is coupled to a first filter (e.g., a highpass filter) for bands A and B in diplexer 480. A second filter (e.g., a lowpass filter) in diplexer 480 may be coupled to a multiplexer and/or other circuits (not shown in FIG. 4A). Diplexer 480 is further coupled to one input of switches 482. Switches 482 may include other inputs coupled to circuits for other radio technologies, other bands, etc. An output of switches 482 is coupled to secondary antenna 492.

In the exemplary design shown in FIG. 4A, quadplexer 430 is coupled to antenna 490 via diplexer 450 and switches 452. In another exemplary design, quadplexer 430 may be coupled to antenna 490 via diplexer 450, and switches 452 may be omitted. In yet another exemplary design, quadplexer 430 may be coupled to antenna 490 via switches 452, and diplexer 450 may be omitted. In yet another exemplary design, quadplexer 430 may be coupled directly to antenna 490. In general, a quadplexer may be directly coupled to an antenna or indirectly coupled to the antenna via one or more circuits. Quadplexer 460 may be coupled to secondary antenna 492 in the same way that quadplexer 430 is coupled to primary antenna 490 (e.g., as shown in FIG. 4A). Alternatively, quadplexer 430 may be coupled to primary antenna 490 in one way, and quadplexer 460 may be coupled to secondary antenna 492 in a different way.

In an exemplary design, a quadplexer (e.g., quadplexer 430 in FIG. 4A) may support two bands and may include (i) a first TX filter and a first RX filter for a first band A and (ii) a second TX filter and a second RX filter for a second band B, e.g., as shown in FIG. 4A. In another exemplary design, a quadplexer may support three bands and may include (i) a first TX filter for one of the three bands, (ii) a second TX filter for the other two of the three bands, (iii) a first RX filter for one of the three bands, and (iv) a second RX filter for the other two of the three bands. For example, a quadplexer may include a first TX filter for band 1 (B1), a second TX filter for band 3 (B3) and band 4 (B4), a first RX filter for B1 and B4, and a second RX filter for B3.

In general, a TX filter may be used for multiple bands if the TX frequency ranges of these bands overlap. An RX filter may be used for multiple bands if the RX frequency ranges of these bands overlap. In the example above, the TX frequency ranges and RX frequency ranges of B1, B3 and B4 may be as follows:

B1: TX/UL=1920-1980 MHz, RX/DL=2110-2170 MHz,
B3: TX/UL=1710-1785 MHz, RX/DL=1805-1880 MHz, and
B4: TX/UL=1710-1755 MHz, RX/DL=2110-2155 MHz.

As shown above, the same TX filter may be used for B3 and B4. The same RX filter may be used for B1 and B4.

Figure 4B:
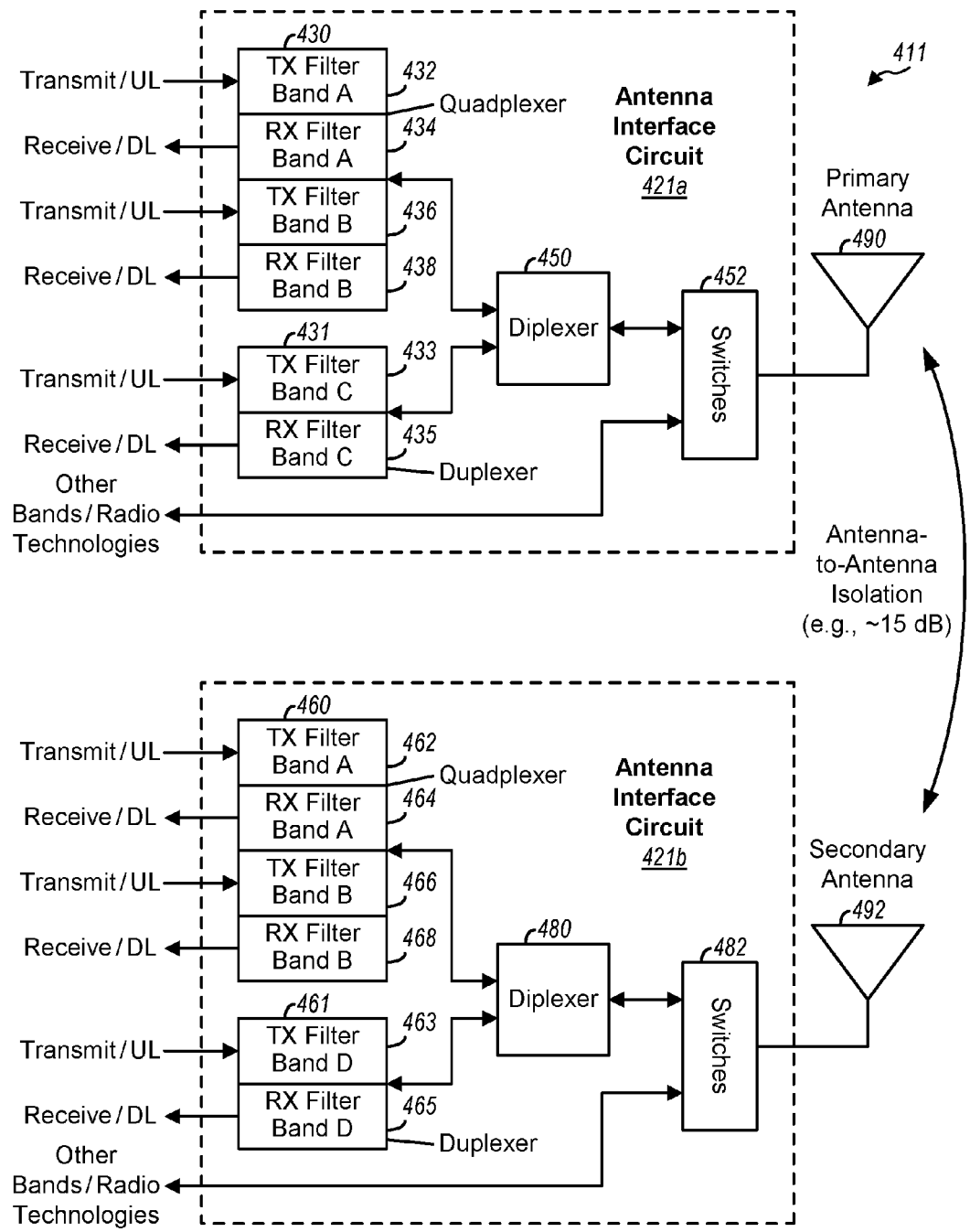

FIG. 4B show an exemplary design of an RF front-end unit 411 comprising antenna interface circuits 421a and 421b supporting carrier aggregation on three bands A, B and C via two antennas. Antenna interface circuits 421a and 421b may be used for antenna interface circuits 352 and 352, respectively, in FIG. 3. Antenna interface circuit 421a supports data transmission on the uplink and data reception on the downlink on bands A, B and C via primary antenna 490. Antenna interface circuit 421b supports data transmission on the uplink and data reception on the downlink on bands A, B and C via secondary antenna 492.

In the exemplary design shown in FIG. 4B, antenna interface circuit 421a includes quadplexer 430 for bands A and B, a duplexer 431 for band C, diplexer 450, and switches 452. Quadplexer 430, diplexer 450, and switches 452 are described above for FIG. 4A. Duplexer 431 includes a TX filter 433 and an RX filter 435 for band C. The output of TX filter 433 and the input of RX filter 435 are coupled to an output of duplexer 431, which is coupled to a second filter (e.g., a lowpass filter) for band C in diplexer 450.

In the exemplary design shown in FIG. 4B, antenna interface circuit 421b includes quadplexer 460 for bands A and B, a duplexer 461 for band C, diplexer 480, and switches 482. Quadplexer 460, diplexer 480, and switches 482 are described above for FIG. 4A. Duplexer 461 includes a TX filter 463 and an RX filter 465 for band C. The output of TX filter 463 and the input of RX filter 465 are coupled to an output of duplexer 461, which is coupled to a second filter (e.g., a lowpass filter) for band C in diplexer 480.

Figure 4C:
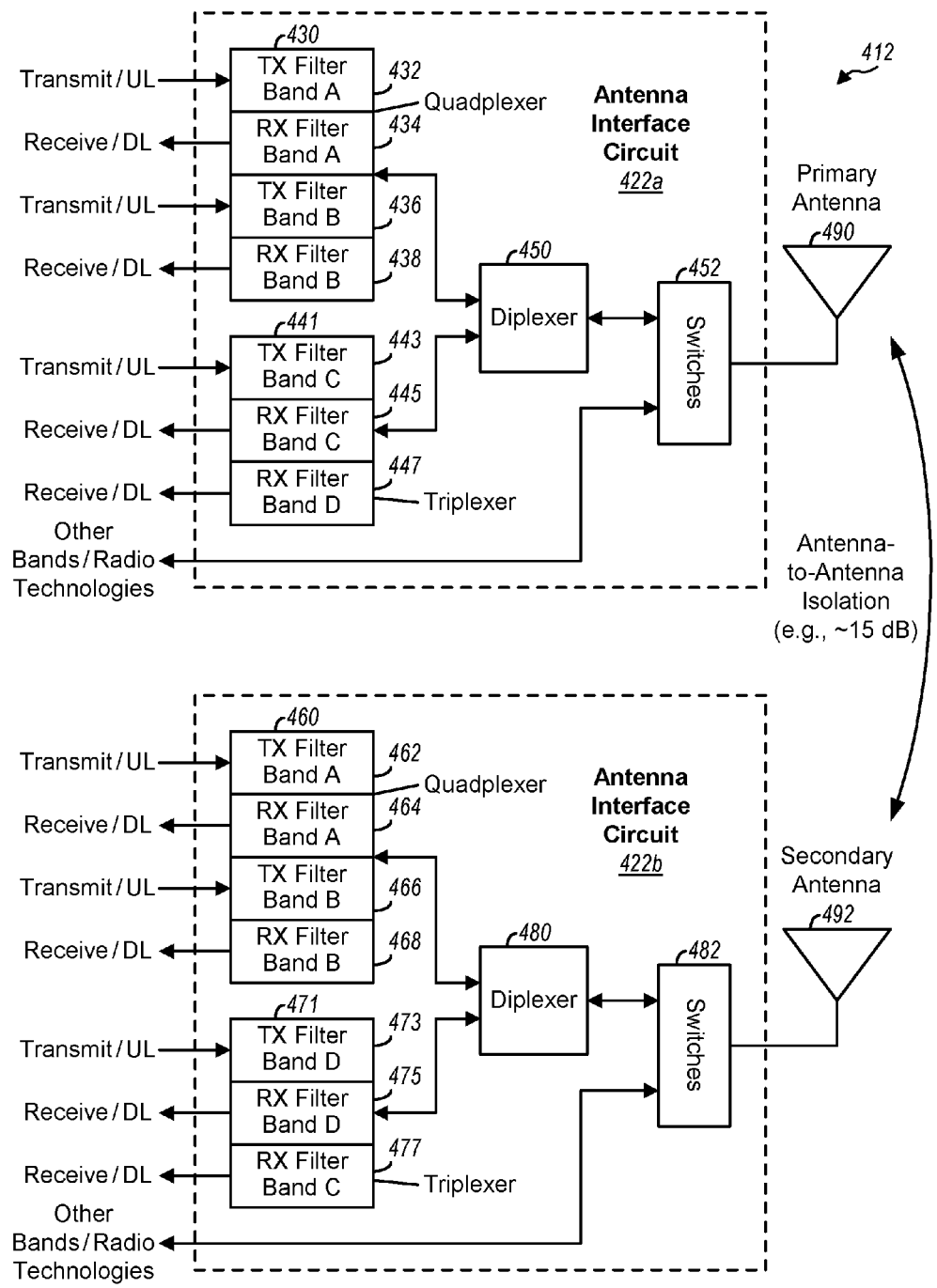

FIG. 4C show an exemplary design of an RF front-end unit 412 comprising antenna interface circuits 422a and 422b supporting carrier aggregation on four bands A, B, C and D via two antennas. Antenna interface circuits 422a and 422b may be used for antenna interface circuits 352 and 352, respectively, in FIG. 3. Antenna interface circuit 422a supports data transmission on the uplink on bands A, B and C and data reception on the downlink on bands A to D via primary antenna 490. Antenna interface circuit 422b supports data transmission on the uplink on bands A, B and D and data reception on the downlink on bands A to D via secondary antenna 492.

In the exemplary design shown in FIG. 4C, antenna interface circuit 422a includes quadplexer 430 for bands A and B, a triplexer 441 for bands C and D, diplexer 450, and switches 452. Quadplexer 430, diplexer 450, and switches 452 are described above for FIG. 4A. Triplexer 441 includes a TX filter 443 for band C, an RX filter 445 for band C, and an RX filter 447 for band D. The output of TX filter 443 and the inputs of RX filters 445 and 447 are coupled to an output of triplexer 441, which is coupled to a second filter (e.g., a lowpass filter) for bands C and D in diplexer 450.

In the exemplary design shown in FIG. 4C, antenna interface circuit 422b includes quadplexer 460 for bands A and B, a triplexer 471 for bands C and D, diplexer 480, and switches 482. Quadplexer 460, diplexer 480, and switches 482 are described above for FIG. 4A. Triplexer 471 includes an RX filter 477 for band C, a TX filter 473 for band D, and an RX filter 475 for band D. The output of TX filter 473 and the inputs of RX filters 475 and 477 are coupled to an output of triplexer 471, which is coupled to a second filter (e.g., a lowpass filter) for bands C and D in diplexer 480.

Bands A to D in FIG. 4C may correspond to various combinations of bands. In a first exemplary design, bands A to D may be as follows:
Band A=Band 3 (B3),
Band B=Band 7 (B7),
Band C=Band 8 (B8), and
Band D=Band 20 (B20).

In the first exemplary design, bands 3 and 7 are in high-band, and bands 8 and 20 are in low-band. Quadplexer 430 may be coupled to a highpass filter within diplexer 450, and triplexer 441 may be coupled to a lowpass filter within diplexer 450. Similarly, quadplexer 460 may be coupled to a highpass filter within diplexer 480, and triplexer 471 may be coupled to a lowpass filter within diplexer 480.

In a second exemplary design, bands A to D may be as follows:
Band A=Band 2 (B2),
Band B=Band 4 (B4),
Band C=Band 5 (B5), and
Band D=Band 17 (B17).

In the second exemplary design, bands 2 and 4 are in high-band, and bands 5 and 17 are in low-band. Quadplexer 430 may be coupled to a highpass filter within diplexer 450, and triplexer 441 may be coupled to a lowpass filter within diplexer 450. Similarly, quadplexer 460 may be coupled to a highpass filter within diplexer 480, and triplexer 471 may be coupled to a lowpass filter within diplexer 480. Bands A to D in FIG. 4C may correspond to other combinations of bands.

The exemplary design in FIG. 4C can support various cases of intra-band CA, inter-band CA, and MIMO. Intra-band CA may be supported on band A or B. For inter-band CA, a first uplink transmission may be sent on a first carrier C1 in band X via the primary antenna, and a second uplink transmission may be sent on a second carrier C2 in band X via the secondary antenna. Band X may correspond to band A or B.

Inter-band CA may be supported for band combinations of (A, B), (A, C), (A, D), and (B, D). For inter-band CA, a first uplink transmission may be sent on a first carrier C1 in band Y via the primary antenna, and a second uplink transmission may be sent on a second carrier C2 in band Z via the secondary antenna. Bands Y and Z may correspond to any of the band combinations listed above. For intra-band CA and inter-band CA, downlink transmissions on carriers C1 and C2 may be received via both the primary and secondary antennas to achieve diversity reception.

MIMO may be supported on band A or B. For MIMO, a first uplink transmission may be sent on a carrier C1 in band X via the primary antenna, and a second uplink transmission may be sent on the same carrier C1 in band X via the secondary antenna. Downlink transmissions on carrier C1 may be received via both the primary and secondary antennas.

Figure 4D:
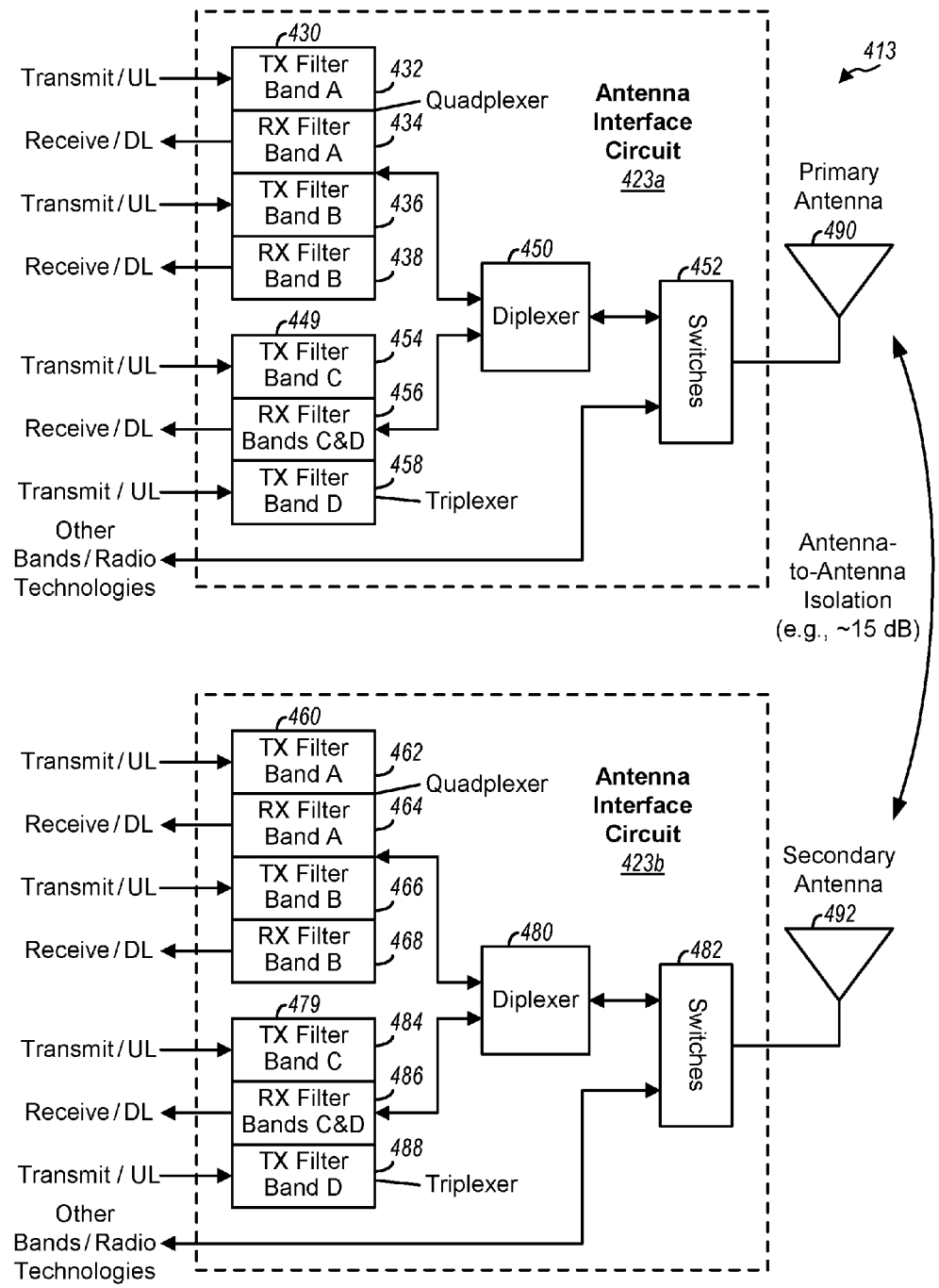

FIG. 4D show an exemplary design of an RF front-end unit 413 comprising antenna interface circuits 423a and 423b supporting carrier aggregation on four bands A, B, C and D via two antennas. Antenna interface circuits 423a and 423b may be used for antenna interface circuits 352 and 352, respectively, in FIG. 3. Antenna interface circuit 423a supports data transmission on the uplink and data reception on the downlink on bands A to D via primary antenna 490. Antenna interface circuit 423b supports data transmission on the uplink and data reception on the downlink on bands A to D via secondary antenna 492.

In the exemplary design shown in FIG. 4D, antenna interface circuit 423a includes quadplexer 430 for bands A and B, a triplexer 449 for bands C and D, diplexer 450, and switches 452. Quadplexer 430, diplexer 450, and switches 452 are described above for FIG. 4A. Triplexer 449 includes a TX filter 454 for band C, an RX filter 456 for bands C and D, and a TX filter 458 for band D. The outputs of TX filters 454 and 458 and the input of RX filter 456 are coupled to an output of triplexer 449, which is coupled to a second filter (e.g., a lowpass filter) for bands C and D in diplexer 450.

In the exemplary design shown in FIG. 4D, antenna interface circuit 423b includes quadplexer 460 for bands A and B, a triplexer 479 for bands C and D, diplexer 480, and switches 482. Quadplexer 460, diplexer 480, and switches 482 are described above for FIG. 4A. Triplexer 479 includes a TX filter 484 for band C, an RX filter 486 for bands C and D, and a TX filter 488 for band D. The outputs of TX filters 484 and 488 and the input of RX filter 486 are coupled to an output of triplexer 479, which is coupled to a second filter (e.g., a lowpass filter) for bands C and D in diplexer 480.

Bands A to D in FIG. 4D may correspond to various combinations of bands. In an exemplary design, bands A, B, C and D may be as follows:
Band A=Band 5 (B5),
Band B=Band 8 (B8), Band C=Band 1 (B1), and
Band D=Band 4 (B4).

In the above exemplary design, bands 5 and 8 are in low-band, and bands 1 and 4 are in high-band. Quadplexer 430 may be coupled to a lowpass filter within diplexer 450, and triplexer 449 may be coupled to a highpass filter within diplexer 450. Similarly, quadplexer 460 may be coupled to a lowpass filter within diplexer 480, and triplexer 479 may be coupled to a highpass filter within diplexer 480. Bands A to D in FIG. 4D may correspond to other combinations of bands.

Figure 4E:
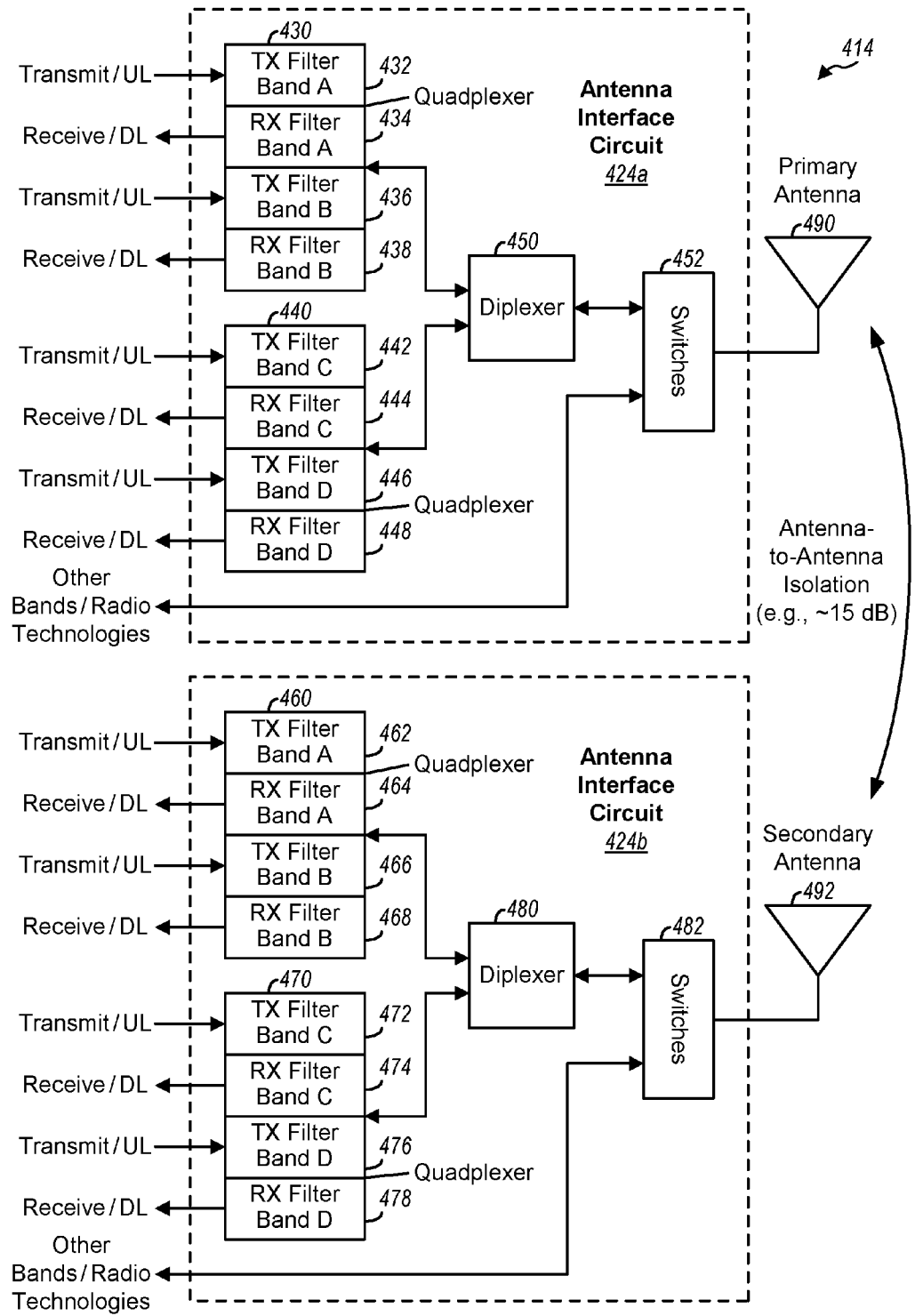

FIG. 4E show an exemplary design of an RF front-end unit 414 comprising antenna interface circuits 424a and 424b supporting carrier aggregation on four bands A, B, C and D via two antennas. Antenna interface circuits 424a and 424b may be used for antenna interface circuits 352 and 352, respectively, in FIG. 3. Antenna interface circuit 424a supports data transmission on the uplink and data reception on the downlink on bands A to D via primary antenna 490. Antenna interface circuit 424b supports data transmission on the uplink and data reception on the downlink on bands A to D via secondary antenna 492.

In the exemplary design shown in FIG. 4E, antenna interface circuit 424a includes quadplexer 430 for bands A and B, a quadplexer 440 for bands C and D, diplexer 450, and switches 452. Quadplexer 430, diplexer 450, and switches 452 are described above for FIG. 4A. Quadplexer 440 includes a TX filter 442 for band C, an RX filter 444 for band C, a TX filter 446 for band D, and an RX filter 448 for band D. The outputs of TX filters 442 and 446 and the inputs of RX filters 444 and 448 are coupled to an output of quadplexer 440, which is coupled to a second filter (e.g., a lowpass filter) for bands C and D in diplexer 450.

In the exemplary design shown in FIG. 4E, antenna interface circuit 424b includes quadplexer 460 for bands A and B, a quadplexer 470 for bands C and D, diplexer 480, and switches 482. Quadplexer 460, diplexer 480, and switches 482 are described above for FIG. 4A. Quadplexer 470 includes a TX filter 472 for band C, an RX filter 474 for band C, a TX filter 476 for band D, and an RX filter 478 for band D. The outputs of TX filters 472 and 476 and the inputs of RX filters 474 and 478 are coupled to an output of quadplexer 470, which is coupled to a second filter (e.g., a lowpass filter) for bands C and D in diplexer 480.

Bands A to D in FIG. 4E may correspond to various combinations of bands. In a first exemplary design, bands A, B, C and D may correspond to bands 3, 7, 8 and 20, respectively. In a second exemplary design, bands A, B, C and D may correspond to bands 2, 4, 5 and 15, respectively. Bands A to D in FIG. 4E may correspond to other combinations of bands.

The exemplary design in FIG. 4E can support various cases of intra-band CA, inter-band CA, and MIMO. Intra-band CA may be supported on band A, B, C or D. For intra-band CA, a first uplink transmission may be sent on a first carrier C1 in band X via the primary antenna, and a second uplink transmission may be sent on a second carrier C2 in band X via the secondary antenna. Band X may correspond to band 2, 4, 5 or 17 in the second exemplary design described above.

Inter-band CA may be supported for all combinations of bands A, B, C and D. For inter-band CA in a LB-HB case, a first uplink transmission may be sent on a first carrier C1 in band Y in low-band via the primary antenna, and a second uplink transmission may be sent on a second carrier C2 in band Z in high-band via the secondary antenna. Band Y may correspond to band 5 or 17, and band Z may correspond to band 2 or 4 in the second exemplary design described above.

For inter-band CA in a LB-LB case, a first uplink transmission may be sent on carrier C1 in band Y in low-band via the primary antenna, and a second uplink transmission may be sent on carrier C2 in band Z in low-band via the secondary antenna. Bands Y and Z may correspond to bands 5 and 17 in the second exemplary design described above.

For inter-band CA in a HB-HB case, a first uplink transmission may be sent on carrier C1 in band Y in high-band via the primary antenna, and a second uplink transmission may be sent on carrier C2 in band Z in high-band via the secondary antenna. Bands Y and Z may correspond to bands 2 and 4 in the second exemplary design described above.

For all intra-band CA and inter-band CA cases described above, downlink transmissions on carriers C1 and C2 may be received via both the primary and secondary antennas to achieve diversity reception.

MIMO may be supported on band A, B, C or D. For MIMO, a first uplink transmission may be sent on a carrier C1 in band X via the primary antenna, and a second uplink transmission may be sent on the same carrier C1 in band X via the secondary antenna. Band X may correspond to band 2, 4, 5 or 17 in the second exemplary design described above. Downlink transmissions on carrier C1 may be received via both the primary and secondary antennas.

Figure 4F:
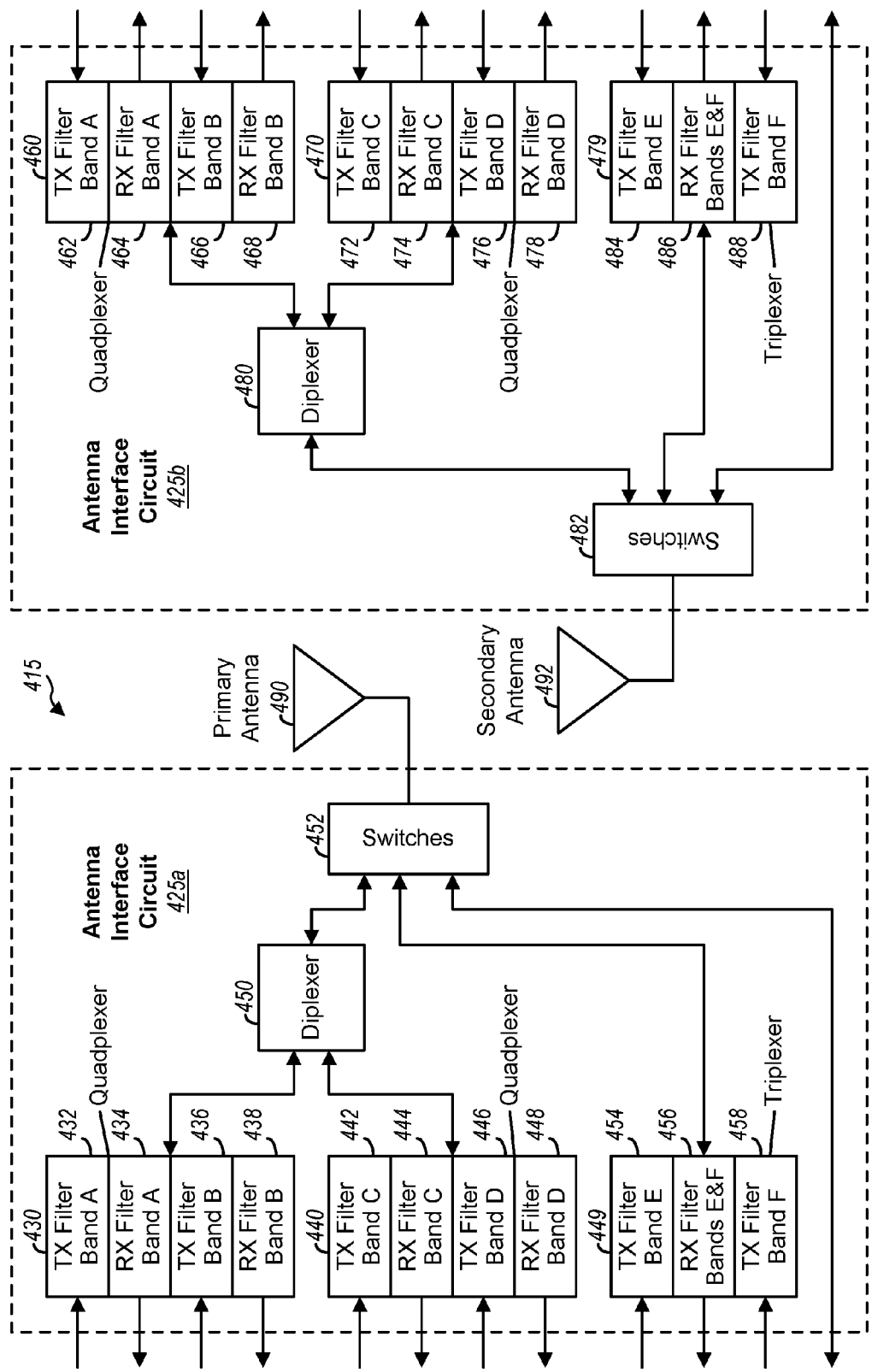

FIG. 4F show an exemplary design of an RF front-end unit 415 comprising antenna interface circuits 425a and 425b supporting carrier aggregation on six bands A to F via two antennas. Antenna interface circuits 425a and 425b may be used for antenna interface circuits 352 and 352, respectively, in FIG. 3. Antenna interface circuit 425a supports data transmission on the uplink and data reception on the downlink on bands A to F via primary antenna 490. Antenna interface circuit 425b supports data transmission on the uplink and data reception on the downlink on bands A to F via secondary antenna 492.

In the exemplary design shown in FIG. 4F, antenna interface circuit 425a includes quadplexer 430 for bands A and B, quadplexer 440 for bands C and D, triplexer 449 for bands E and F, diplexer 450, and switches 452. Quadplexers 430 and 440, diplexer 450, and switches 452 are described above for FIG. 4E. Triplexer 449 includes TX filter 454 for band E, RX filter 456 for bands E and F, and TX filter 458 for band F. The outputs of TX filters 454 and 458 and the input of RX filter 456 are coupled to an output of triplexer 449, which is coupled to another input of switches 452.

In the exemplary design shown in FIG. 4F, antenna interface circuit 425b includes quadplexer 460 for bands A and B, quadplexer 470 for bands C and D, triplexer 479 for bands E and F, diplexer 480, and switches 482. Quadplexers 460 and 470, diplexer 480, and switches 482 are described above for FIG. 4E. Triplexer 479 includes TX filter 484 for band E, RX filter 486 for bands E and F, and TX filter 488 for band F. The outputs of TX filters 484 and 488 and the input of RX filter 486 are coupled to an output of triplexer 479, which is coupled to another input of switches 482.

Figure 4G:
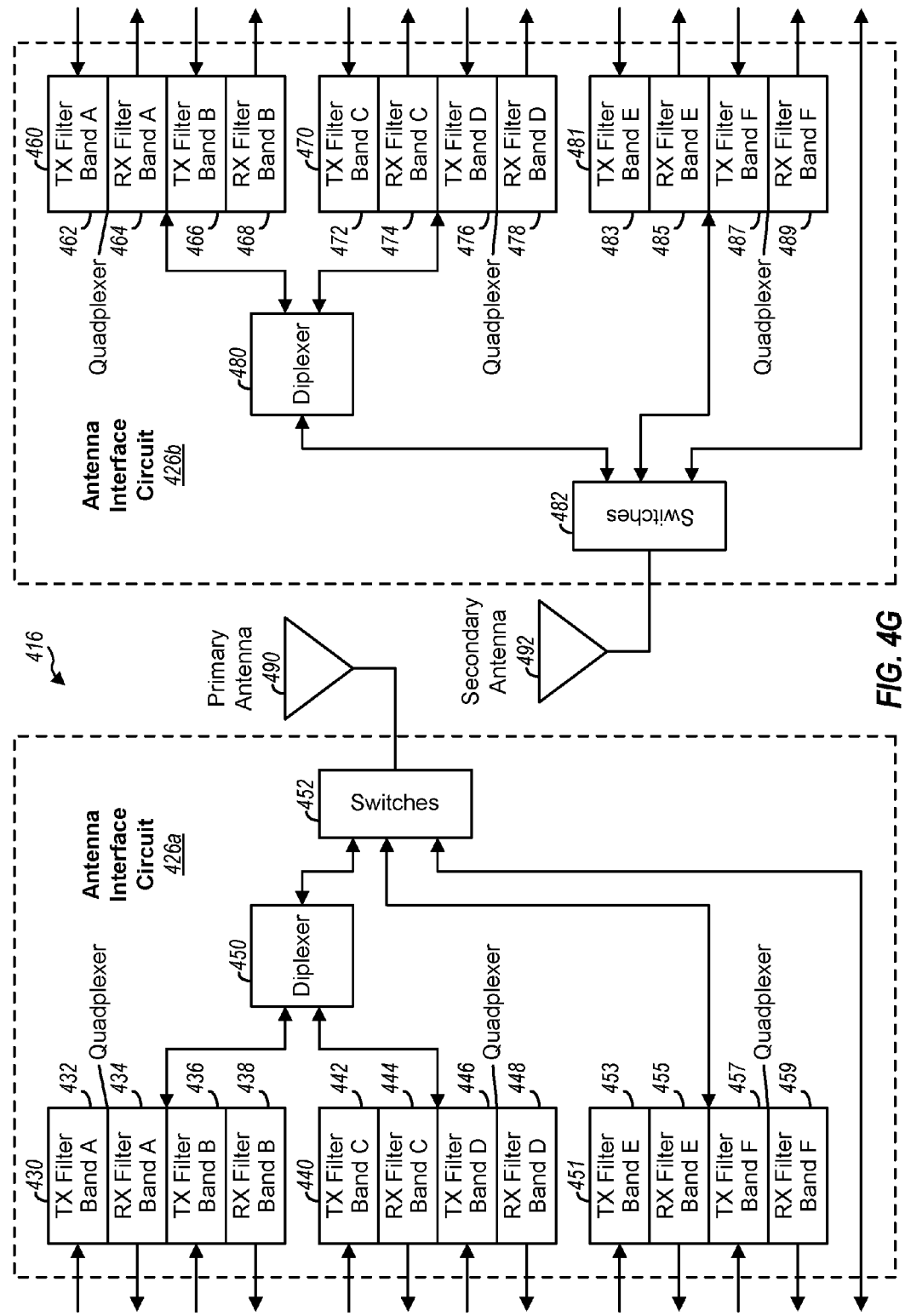

FIG. 4G show an exemplary design of an RF front-end unit 416 comprising antenna interface circuits 426a and 426b supporting carrier aggregation on six bands A to F via two antennas. Antenna interface circuits 426a and 426b may be used for antenna interface circuits 352 and 352, respectively, in FIG. 3. Antenna interface circuit 426a supports data transmission on the uplink and data reception on the downlink on bands A to F via primary antenna 490. Antenna interface circuit 426b supports data transmission on the uplink and data reception on the downlink on bands A to F via secondary antenna 492.

In the exemplary design shown in FIG. 4G, antenna interface circuit 426a includes quadplexer 430 for bands A and B, quadplexer 440 for bands C and D, a quadplexer 451 for bands E and F, diplexer 450, and switches 452. Quadplexers 430 and 440, diplexer 450, and switches 452 are described above for FIG. 4E. Quadplexer 451 includes a TX filter 453 for band E, an RX filter 455 for band E, a TX filter 457 for band F, and an RX filter 459 for band F. The outputs of TX filters 453 and 457 and the inputs of RX filters 455 and 459 are coupled to an output of quadplexer 451, which is coupled to another input of switches 452.

In the exemplary design shown in FIG. 4G, antenna interface circuit 426b includes quadplexer 460 for bands A and B, quadplexer 470 for bands C and D, a quadplexer 481 for bands E and F, diplexer 480, and switches 482. Quadplexers 460 and 470, diplexer 480, and switches 482 are described above for FIG. 4E. Quadplexer 481 includes a TX filter 483 for band E, an RX filter 485 for band E, a TX filter 487 for band F, and an RX filter 489 for band F. The outputs of TX filters 483 and 487 and the inputs of RX filters 485 and 489 are coupled to an output of quadplexer 481, which is coupled to another input of switches 482.

Bands A to F in FIGS. 4F and 4G may correspond to various combinations of bands. In an exemplary design, bands A to F may be as follows:
Band A=Band 1 (B1),
Band B=Band 3 (B3),
Band C=Band 13 (B13)
Band D=Band 20 (B20),
Band E=Band 7 (B7), and
Band F=Band 9 (B9).

In the above exemplary design, bands 1 and 3 are in high-band, bands 13 and 20 are in low-band, and bands 7 and 9 are in high-band. Bands A to F may correspond to other combinations of bands.

Figure 5:
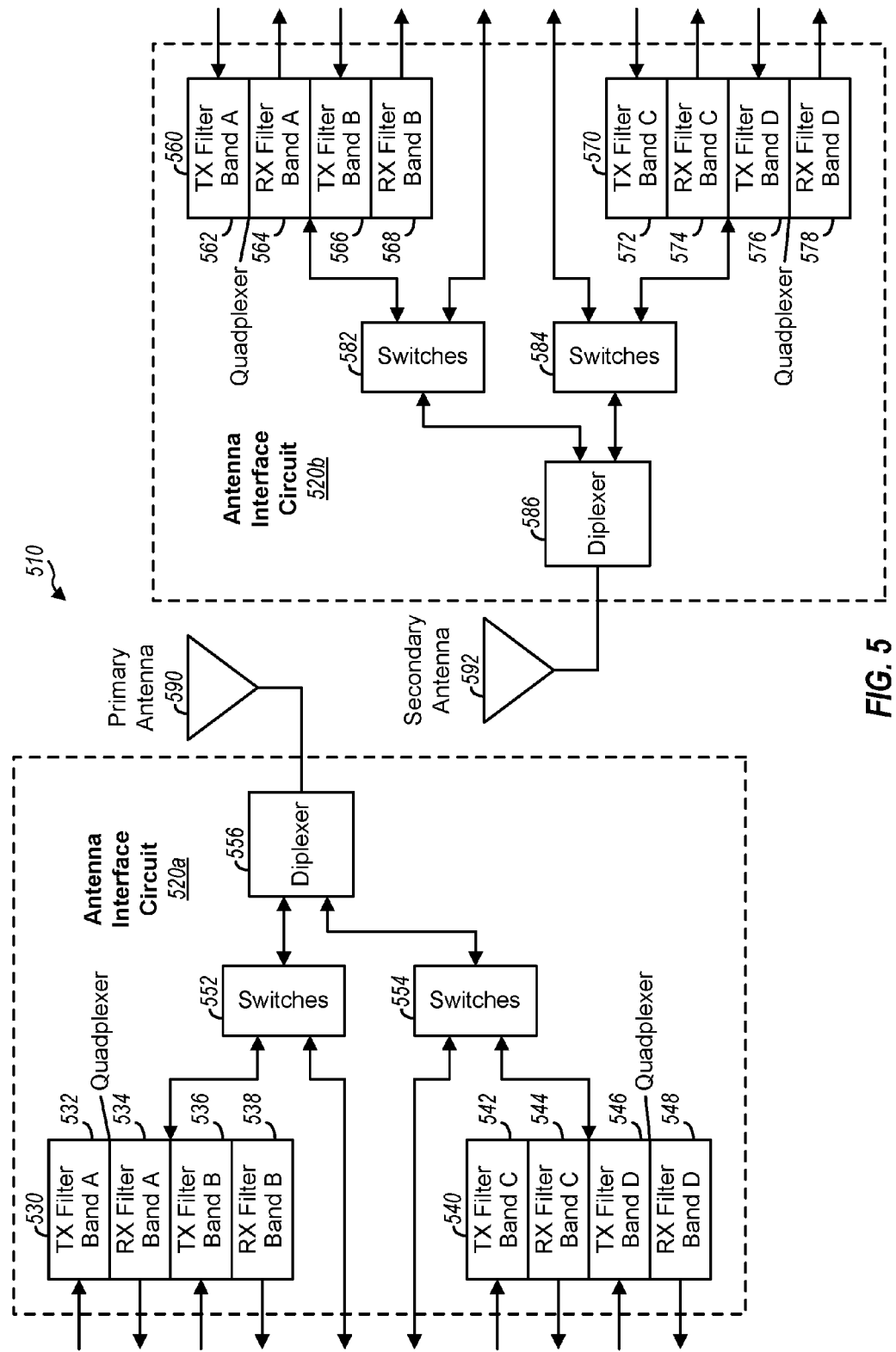

FIG. 5 show an exemplary design of an RF front-end unit 510 comprising antenna interface circuits 520a and 520b supporting carrier aggregation on four bands A to D via two antennas. Antenna interface circuits 520a and 520b may be used for antenna interface circuits 352 and 352, respectively, in FIG. 3. Antenna interface circuit 520a supports data transmission on the uplink and data reception on the downlink on bands A to D via a primary antenna 590. Antenna interface circuit 520b supports data transmission on the uplink and data reception on the downlink on bands A to D via a secondary antenna 592.

In the exemplary design shown in FIG. 5, antenna interface circuit 520a includes a quadplexer 530 for bands A and B, a quadplexer 540 for bands C and D, switches 552 and 554, and a diplexer 556. Quadplexer 530 includes a TX filter 532 for band A, an RX filter 534 for band A, a TX filter 536 for band B, and an RX filter 538 for band B. The outputs of TX filters 532 and 536 and the inputs of RX filters 534 and 538 are coupled to an output of quadplexer 530, which is further coupled to a first input of switches 552. Quadplexer 540 includes a TX filter 542 for band C, an RX filter 544 for band C, a TX filter 546 for band D, and an RX filter 548 for band D. The outputs of TX filters 542 and 546 and the inputs of RX filters 544 and 548 are coupled to an output of quadplexer 540, which is further coupled to a first input of switches 554. Switches 552 and 554 may include other inputs coupled to circuits for other radio technologies, other bands, etc. An output of switches 552 is coupled a first filter (e.g., a highpass filter) for bands A and B in diplexer 556. An output of switches 554 is coupled a second filter (e.g., a lowpass filter) for bands C and D in diplexer 556. The output of diplexer 556 is coupled to primary antenna 590.

In the exemplary design shown in FIG. 5, antenna interface circuit 520b includes a quadplexer 560 for bands A and B, a quadplexer 570 for bands C and D, switches 582 and 584, and a diplexer 586. Quadplexer 560 includes a TX filter 562 for band A, an RX filter 564 for band A, a TX filter 566 for band B, and an RX filter 568 for band B. The outputs of TX filters 562 and 566 and the inputs of RX filters 564 and 568 are coupled to an output of quadplexer 560, which is further coupled to a first input of switches 582. Quadplexer 570 includes a TX filter 572 for band C, an RX filter 574 for band C, a TX filter 576 for band D, and an RX filter 578 for band D. The outputs of TX filters 572 and 576 and the inputs of RX filters 574 and 578 are coupled to an output of quadplexer 570, which is further coupled to a first input of switches 584. Switches 582 and 584 may include other inputs coupled to circuits for other radio technologies, other bands, etc. An output of switches 582 is coupled a first filter (e.g., a highpass filter) for bands A and B in diplexer 586. An output of switches 584 is coupled a second filter (e.g., a lowpass filter) for bands C and D in diplexer 586. The output of diplexer 586 is coupled to secondary antenna 592.

The exemplary design in FIG. 5 can easily support additional bands by coupling one or more multiplexers (e.g., duplexers, triplexers, and/or quadplexers) to other inputs of switches 552, 554, 582 and/or 584.

An antenna interface circuit may include one or more quadplexers, e.g., as shown in FIGS. 4A to 5. A quadplexer may include two TX filters and two RX filters for two bands, e.g., as shown in FIGS. 4A to 5. In this case, each TX filter may cover one band, and each RX filter may also cover one band. A quadplexer may also include two TX filters and two RX filters for three bands, as described above. In this case, one TX filter may cover one band, the other TX filter may cover two bands, one RX filter may cover one band, and the other RX filter may cover two bands.

A quadplexer may include two duplexers for two bands, which may be in the same band group and may thus be relatively close together in frequency. For example, a quadplexer may include (i) a first duplexer for band 2 having a transmit/uplink frequency range of 1850 to 1910 MHz and a receive/downlink frequency range of 1930 to 1990 MHz and (ii) a second duplexer for band 4 having a transmit/uplink frequency range of 1710 to 1755 MHz and a receive/downlink frequency range of 2110 to 2155 MHz. Because of the close frequency separation between the two bands, it may not be practical to combine the two duplexers with a diplexer, as is conventionally done.

Figure 6:
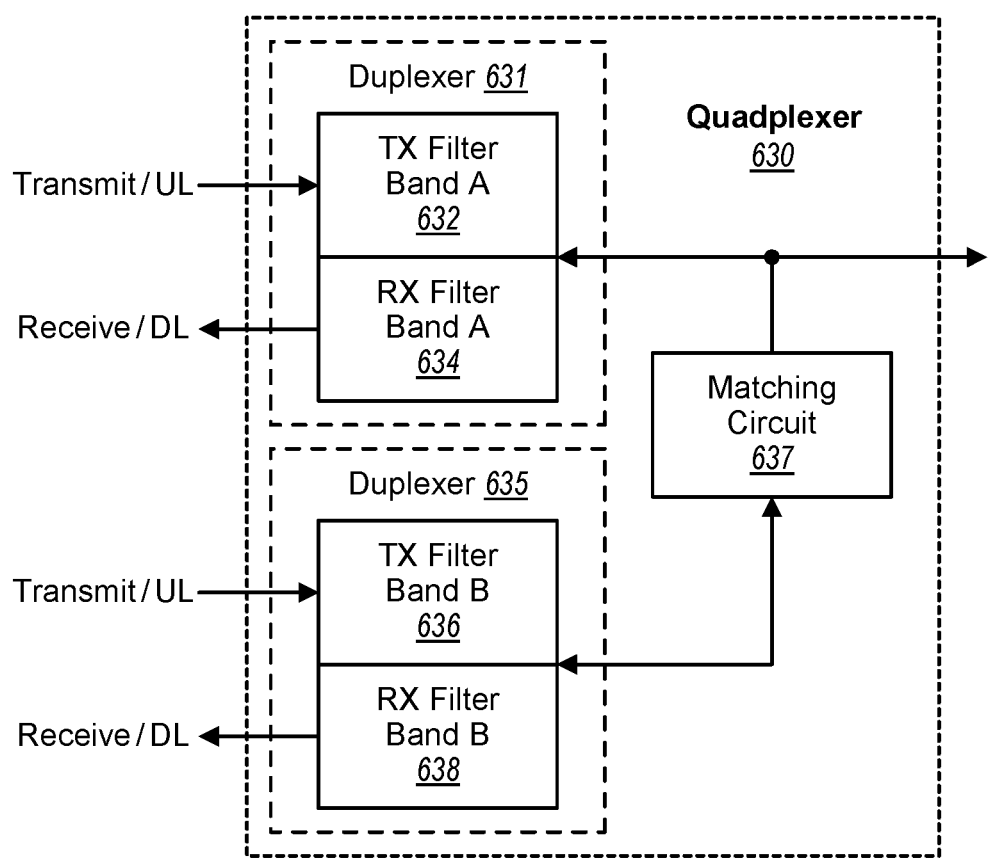
FIG. 6 shows an exemplary design of a quadplexer for two bands.

FIG. 6 shows an exemplary design of a quadplexer 630 for two bands in one band group. Quadplexer 630 includes a first duplexer 631 for a first band A, a second duplexer 635 for a second band B, and a matching circuit 637. Duplexer 631 includes a TX filter 632 and an RX filter 634 for band A. The output of TX filter 632 and the input of RX filter 634 are coupled to an output of duplexer 631. Duplexer 635 includes a TX filter 636 and an RX filter 638 for band B. The output of TX filter 636 and the input of RX filter 638 are coupled to an output of duplexer 635. Matching circuit 637 is coupled between the output of duplexer 631 and the output of duplexer 635. Matching circuit 637 may perform power and/or impedance matching between the outputs of duplexers 631 and 635 in order to obtain good performance.

The antenna interface circuits disclosed herein include various advantageous features. First, an antenna interface circuit comprising a quadplexer and a diplexer (e.g., as shown in FIG. 4A) or two quadplexers and a diplexer (e.g., as shown in FIG. 4E) may be used for each antenna and may readily support inter-band CA, intra-band CA, and MIMO. For example, antenna interface circuits 424a and 424b in FIG. 4E may support (i) all combinations of bands A to D for inter-band CA, (ii) intra-band CA from two transmit chains or from the same transmit chain, and (iii) MIMO transmission for all four bands A to D.

Second, the same quadplexer may be used for different antennas, which may simplify manufacturing of wireless devices. In particular, the same quadplexer for bands A and B may be used for the primary antenna and also for the secondary antenna in FIGS. 4A to 5. The same quadplexer for bands C and D may be used for the primary antenna and also for the secondary antenna in FIGS. 4E to 5. A quadplexer for the secondary antenna may thus be a duplicate of a quadplexer for the primary antenna.

Third, simultaneously transmission on two bands for CA via two antennas with partial multiplexing may benefit from antenna-to-antenna isolation, which may be approximately 15 decibels (dB) for one exemplary design. For example, a first uplink transmission/output RF signal may be sent on band A via the primary antenna, and a second uplink transmission/output RF signal may be sent on band B via the secondary antenna. The antenna-to-antenna isolation may mitigate IMD, especially when there are harmonic relations between the two bands. The antenna-to-antenna isolation may also avoid the need for additional filters to attenuate harmonics and other undesired signals. In contrast, simultaneously sending two uplink transmissions on two bands via the same antenna may require extra design efforts in order to achieve sufficiently low harmonic and IMD products.

Fourth, output RF signals may be transmitted via antennas selected to provide good performance. Duplicate quadplexers may be used for the two antennas, e.g., as shown in FIGS. 4A to 5. In this case, a first output RF signal may be sent on band A via the primary antenna, and a second output RF signal may be sent on band B via the secondary antenna. Alternatively, the first output RF signal may be sent on band A via the secondary antenna, and the second output RF signal may be sent on band B via the primary antenna. The first and second output RF signals may be switched between the primary and secondary antennas (e.g., based on an indication or a command from a recipient base station) in order to achieve good performance.

Fifth, fewer circuit components may be needed to support intra-band CA, inter-band CA, and MIMO. Four or more filters may be included in each quadplexer. Implementing antenna interface circuits with quadplexers may thus reduce component count.

In an exemplary design, an apparatus (e.g., a wireless device, an IC, a circuit module, etc.) may comprise first and second antenna interface circuits. The first antenna interface circuit (e.g., antenna interface circuit 420a in FIG. 4A) may be coupled to a first antenna and may comprise a first quadplexer (e.g., quadplexer 430) for first and second bands. The second antenna interface circuit (e.g., antenna interface circuit 420b in FIG. 4A) may be coupled to a second antenna and may comprise a second quadplexer (e.g., quadplexer 460) for the first and second bands.

In an exemplary design, the first antenna interface circuit may further comprise a first diplexer (e.g., diplexer 450 in FIG. 4A). The second antenna interface circuit may further comprise a second diplexer (e.g., diplexer 480).

In an exemplary design, the first antenna interface circuit may further comprise a first duplexer (e.g., duplexer 431 in FIG. 4B) for a third band. The second antenna interface circuit may further comprise a second duplexer (e.g., duplexer 461) for the third band.

In another exemplary design, the first antenna interface circuit may further comprise a first triplexer (e.g., triplexer 441 in FIG. 4C or triplexer 449 in FIG. 4D) for third and fourth bands. The second antenna interface circuit may further comprise a second triplexer (e.g., triplexer 471 in FIG. 4C or triplexer 479 in FIG. 4D) for the third and fourth bands. In one exemplary design that is shown in FIG. 4C, the first triplexer may comprise a TX filter (e.g., TX filter 443) for the third band, an RX filter (e.g., RX filter 445) for the third band, and an RX filter (e.g., RX filter 447) for the fourth band. The second triplexer may comprise a TX filter (e.g., TX filter 473) for the fourth band, an RX filter (e.g., RX filter 477) for the third band, and an RX filter (e.g., RX filter 475) for the fourth band. In another exemplary design that is shown in FIG. 4D, the first triplexer may comprise a TX filter (e.g., TX filter 454) for the third band, a TX filter (e.g., TX filter 458) for the fourth band, and an RX filter (e.g., RX filter 456) for the third and fourth bands. The second triplexer may comprise a TX filter (e.g., TX filter 484) for the third band, a TX filter (e.g., TX filter 488) for the fourth band, and an RX filter (e.g., RX filter 486) for the third and fourth bands.

In another exemplary design, the first antenna interface circuit may further comprise a third quadplexer (e.g., quadplexer 440 in FIG. 4E) for third and fourth bands. The second antenna interface circuit may further comprise a fourth quadplexer (e.g., quadplexer 470) for the third and fourth bands. The first and second quadplexers may be for a first band group (e.g., low-band). The third and fourth quadplexers may be for a second band group (e.g., high-band). In an exemplary design, the first antenna interface circuit may further comprise a fifth quadplexer (e.g., quadplexer 451 in FIG. 4G) for fifth and sixth bands. The second antenna interface circuit may further comprise a sixth quadplexer (e.g., quadplexer 481) for the fifth and sixth bands. In an exemplary design, the first quadplexer may be a duplicate of the second quadplexer. The third quadplexer may be a duplicate of the fourth quadplexer. The fifth quadplexer may be a duplicate of the sixth quadplexer.

In an exemplary design, the first quadplexer may comprise first and second duplexers and a matching circuit. The first duplexer (e.g., duplexer 631 in FIG. 6) may comprise a first TX filter and a first RX filter for the first band. The second duplexer (e.g., duplexer 635) may comprise a second TX filter and a second RX filter for the second band. The matching circuit (e.g., matching circuit 637) may be coupled between the first and second duplexers. Each remaining quadplexer may be implemented in similar manner.

In an exemplary design, the first diplexer may comprise (i) a first filter (e.g., a highpass filter) coupled to the first quadplexer and (ii) a second filter (e.g., a lowpass filter) coupled to a duplexer, or a triplexer, or another quadplexer. The second diplexer may similarly comprise a lowpass filter and a highpass filter.

In an exemplary design, the first antenna interface circuit may further comprise first switches (e.g., switches 452 in FIG. 4A) coupled between the first diplexer and the first antenna. The second antenna interface circuit may further comprise second switches (e.g., switches 482 in FIG. 4A) coupled between the second diplexer and the second antenna. In another exemplary design, the first antenna interface circuit may further comprise first switches (e.g., switches 552 in FIG. 5) coupled between the first quadplexer and the first diplexer. The second antenna interface circuit may further comprise second switches (e.g., switches 582 in FIG. 5) coupled between the second quadplexer and the second diplexer. The switches may be used to support other bands and/or radio technologies.

In an exemplary design, partial multiplexing may be used for carrier aggregation. The first antenna interface circuit may route a first RF signal sent on a first carrier (e.g., in the first band) to the first antenna. The second antenna interface circuit may route a second RF signal sent on a second carrier (e.g., in the second band) to the second antenna. The first and second RF signals may be switched between antennas. For example, the first antenna interface circuit may route the second RF signal to the first antenna in response to a switching control. The second antenna interface circuit may route the first RF signal to the second antenna in response to the switching control.

Figure 7:
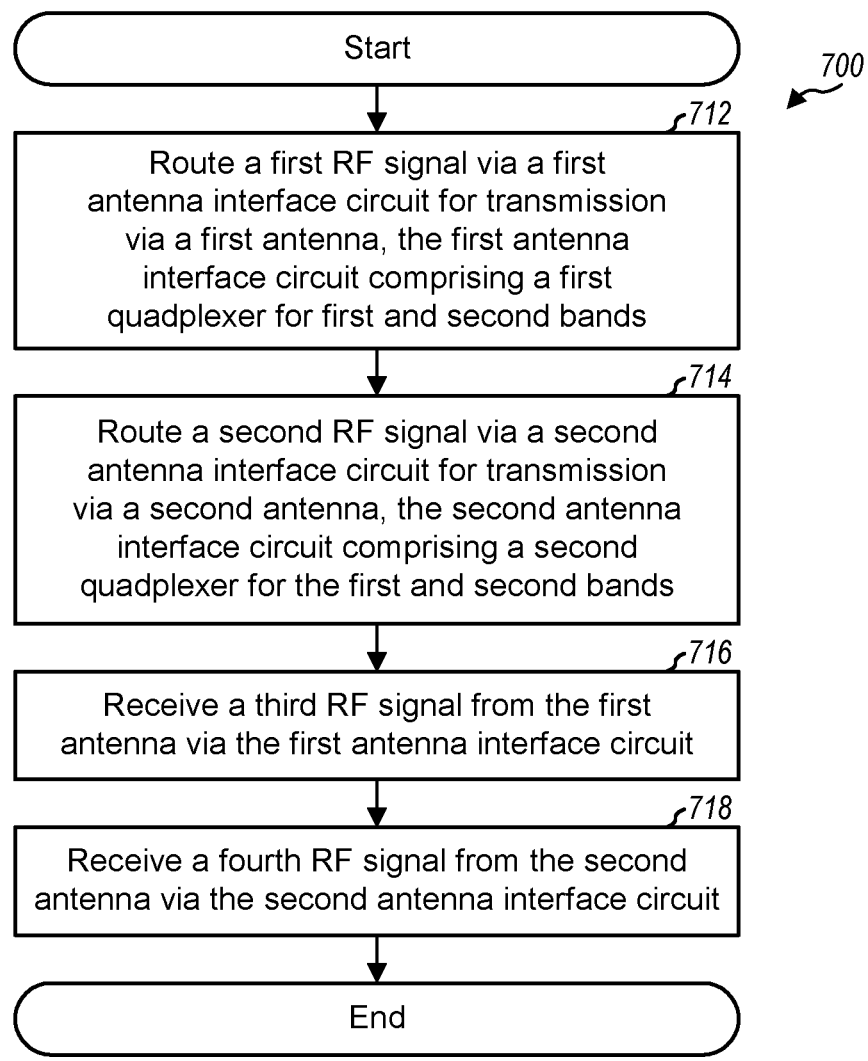
FIG. 7 shows a process for supporting carrier aggregation.

FIG. 7 shows an exemplary design of a process 700 for supporting communication. A first RF signal may be routed via a first antenna interface circuit for transmission via a first antenna (block 712). The first antenna interface circuit may comprise a first quadplexer for first and second bands. A second RF signal may be routed via a second antenna interface circuit for transmission via a second antenna (block 714). The second antenna interface circuit may comprise a second quadplexer for the first and second bands. The first antenna interface circuit may further comprise a first diplexer and/or other circuits. The second antenna interface circuit may further comprise a second diplexer and/or other circuits.

A third RF signal may be received from the first antenna via the first antenna interface circuit (block 716). A fourth RF signal may be received from the second antenna via the second antenna interface circuit (block 718). The first and third RF signals may be for communication on a first carrier. The second and fourth RF signals may be for communication on a second carrier for carrier aggregation. A fifth RF signal may be received from the first antenna via the first antenna interface circuit. A sixth RF signal may be received from the second antenna via the second antenna interface circuit. The third and sixth RF signals may be for diversity reception on the first carrier. The fourth and fifth RF signals may be for diversity reception on the second carrier.

The antenna interface circuits described herein may be implemented on an IC, an analog IC, an RFIC, a mixed-signal IC, an application specific integrated circuit (ASIC), a printed circuit board (PCB), an electronic device, etc. The antenna interface circuits may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the antenna interface circuits described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disc and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for carrier aggregation, comprising:
a first antenna interface circuit coupled to a first antenna, the first antenna interface circuit comprising a first quadplexer and a first multiplexer, the first quadplexer comprising a first transmit filter and a first receive filter for a first band and a second transmit filter and a second receive filter for a second band, and the first multiplexer configured to filter transmit and receive signals for third and fourth bands; and
a second antenna interface circuit coupled to a second antenna, the second antenna interface circuit comprising a second quadplexer and a second multiplexer, the second quadplexer comprising a third transmit filter and a third receive filter for the first band and a fourth transmit filter and a fourth receive filter for the second band, and the second multiplexer configured to filter transmit and receive signals for the third and fourth bands.

2. The apparatus of claim 1, wherein the first and second antenna interface circuits are configured to simultaneously transmit or simultaneously receive signals in at least the first and second bands.

3. The apparatus of claim 1, wherein the first antenna interface circuit further comprises a first diplexer.

4. The apparatus of claim 3, wherein the second antenna interface circuit further comprises a second diplexer.

5. The apparatus of claim 4, wherein the first antenna interface circuit further comprises first switches coupled between the first diplexer and the first antenna, and the second antenna interface circuit further comprises second switches coupled between the second diplexer and the second antenna.

6. The apparatus of claim 3, wherein the first antenna interface circuit further comprises first switches coupled between the first quadplexer and the first diplexer.

7. The apparatus of claim 1, wherein the first multiplexer comprises a first triplexer for the third and fourth bands.

8. The apparatus of claim 7, wherein the second multiplexer comprises a second triplexer for the third and fourth bands.

9. The apparatus of claim 8, wherein the first triplexer comprises a fifth transmit filter for the third band, a sixth transmit filter for the fourth band, and a fifth receive filter for the third and fourth bands, and wherein the second triplexer comprises a seventh transmit filter for the third band, an eight transmit filter for the fourth band, and a sixth receive filter for the third and fourth bands.

10. The apparatus of claim 1, wherein the first multiplexer comprises a third quadplexer for the third and fourth bands.

11. The apparatus of claim 10, wherein the second multiplexer comprises a fourth quadplexer for the third and fourth bands.

12. The apparatus of claim 11, wherein the first antenna interface circuit further comprises a fifth quadplexer or a first triplexer for fifth and sixth bands, and the second antenna interface circuit further comprises a sixth quadplexer or a second triplexer for the fifth and sixth bands.

13. The apparatus of claim 10, wherein the first antenna interface circuit further comprises a diplexer comprising: a lowpass filter coupled to the first quadplexer; and a highpass filter coupled to the third quadplexer.

14. The apparatus of claim 1, wherein the first quadplexer comprises: a first duplexer comprising the first transmit filter and the first receive filter for the first band; a second duplexer comprising the second transmit filter and the second receive filter for the second band; and a matching circuit coupled between the first and second duplexers.

15. The apparatus of claim 1, wherein the first antenna interface circuit is configured to route a first radio frequency signal on a first carrier to the first antenna, and the second antenna interface circuit is configured to route a second radio frequency signal on a second carrier to the second antenna.

16. The apparatus of claim 15, wherein the first antenna interface circuit is configured to route the second radio frequency signal to the first antenna in response to a switching control, and the second antenna interface circuit is configured to route the first radio frequency signal to the second antenna in response to the switching control.

17. A method for carrier aggregation, comprising:
routing a first radio frequency signal via a first antenna interface circuit coupled to a first antenna, the first antenna interface circuit comprising a first quadplexer and a first multiplexer, the first quadplexer comprising a first transmit filter and a first receive filter for a first band and a second transmit filter and a second receive filter for a second band, and the first multiplexer configured to filter transmit and receive signals for third and fourth bands; and
routing a second radio frequency signal via a second antenna interface circuit coupled to a second antenna, the second antenna interface circuit comprising a second quadplexer and a second multiplexer, the second quadplexer comprising a third transmit filter and a third receive filter for the first band and a fourth transmit filter and a fourth receive filter for the second band, and the second multiplexer configured to filter transmit and receive signals for the third and fourth bands.

18. The method of claim 17, further comprising simultaneously transmitting or simultaneously receiving at least the first and second bands.

19. An apparatus, comprising:
means for routing a first radio frequency signal for a first antenna, the means for routing the first radio frequency signal comprising first filtering means for first and second bands and second filtering means for third and fourth bands, the first filtering means comprising a first transmit filtering means for filtering transmit signals and a first receive filtering means for filtering receive signals for the first band and a second transmit filtering means for filtering transmit signals and a second receive filtering means for filtering receive signals for the second band; and
means for routing a second radio frequency signal for a second antenna, the means for routing the second radio frequency signal comprising third filtering means for the first and second bands and fourth filtering means for the third and fourth bands, the third filtering means comprising a third transmit filtering means for filtering transmit signals and a third receive filtering means for filtering receive signals for the first band and a fourth transmit filtering means for filtering transmit signals and a fourth receive filtering means for filtering receive signals for the second band.

20. The apparatus of claim 19, wherein the means for routing the first radio frequency signal and the means for routing the second radio frequency signal are configured for performing carrier aggregation by simultaneously transmitting or simultaneously receiving at least the first and second bands.

* * * * *